March 21, 1967 C. L. FISHER 3,309,817
MECHANICALLY FASTENED DOOR WEATHER STRIP
Filed Aug. 17, 1964
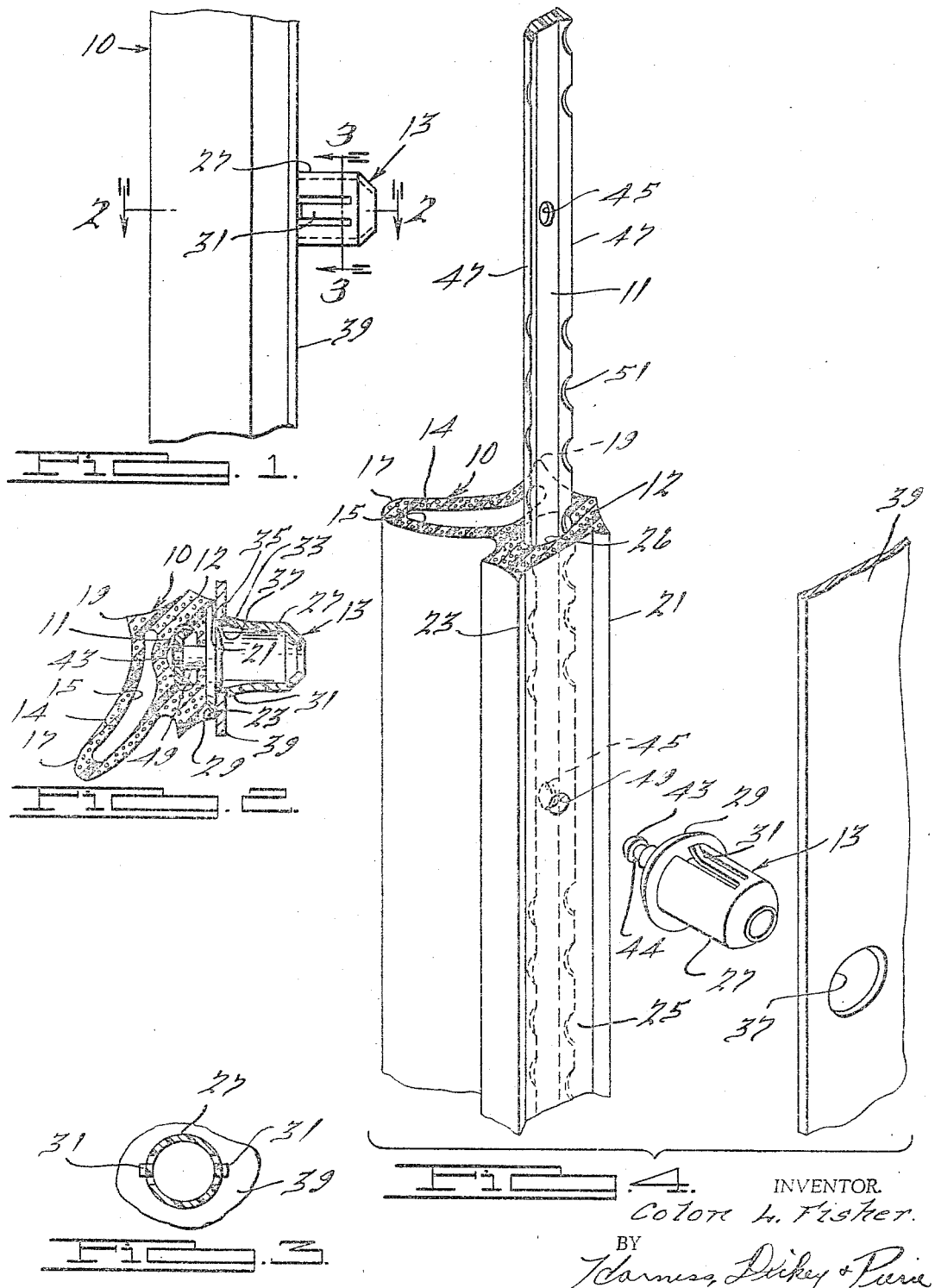
INVENTOR.
Coton L. Fisher.

United States Patent Office 3,309,817
Patented Mar. 21, 1967

3,309,817
MECHANICALLY FASTENED DOOR
WEATHER STRIP
Colon Lewis Fisher, Keokuk, Iowa, assignor to Sheller Manufacturing Corporation, Detroit, Mich., a corporation of Indiana
Filed Aug. 17, 1964, Ser. No. 390,067
6 Claims. (Cl. 49—492)

This invention relates generally to flexible sealing strips, and more particularly to rubber-like sealing strips that are particularly adapted for use in providing a weathertight seal around metallic door openings, such as automotive vehicle doors.

Weather strip assemblies, such as, for example, those adapted to provide a seal between an automobile door or other closure device and the adjacent closure frame assembly, include an elastomeric sealing strip suitably attached to one of either the closure or the adjacent closure frame and adapted to resiliently engage the other and form an air and weathertight seal when the closure is in its closed position. Attaching means for these sealing strips in the past have taken many forms ranging from various known adhesive substances to mechanical contrivances or a combination thereof. However, known adhesives have a tendency to lose their strong adhesive power after exposure to the elements and/or fatigue resulting from repeated sticking of the strip to the door frame during extremely hot or extremely cold periods as the door is opened and closed. Typical mechanical attaching devices depend upon resilient contact between the door frame and a spring member normally embedded in the rubber-like strip and in addition to the metal-to-metal contact promoting corrosion breakdown, the resilience in the spring member decreases with time and allows the strip to be separated from the door frame. There is therefore a current need for weatherstrip assemblies that do not suffer from the above recited defects.

The present invention provides a new type of weatherstrip assembly relative to those heretofore known. The weatherstrip assembly of this invention is designed for use with a variety of door configurations and is capable of maintaining a highly effective seal, withstanding long, hard usage, is highly effective against deterioration from the elements themselves and does not promote or enhance the likelihood of corrosion in the member to which it is attached. Further, this weather stripping assembly is adapted for easy production and rapid assembly and may be removed from its mounting and remounted without destroying its sealing capabilities or its adherence properties.

It is the primary object of the present invention to provide an improved weather strip assembly including a non-metallic mechanical fastener which is adapted to provide a positive seal for a door or other closure.

A further object of the present invention is to provide an improved weather strip of the above character which is usable with a variety of door configurations and will remain in positive, weather-proof contact with its supporting surface member after repeated closings, and provide an effective, tight seal with its mating surface over extended periods of time.

A further object of the present invention is to provide an improved weather strip of the above character which is free of metallic components or inserts and is not susceptible to corrosion and rust, and which does not enhance the likelihood of corrosion of the supporting member to which it is attached.

A further object of the present invention is to provide an improved weather strip of the above character which is easily attached, remains in positive contact with its supporting surface but which may be removed without destroying the rubber and replaced when desired.

A still further object of the present invention is to provide an improved weather strip of the above character which is relatively inexpensive and rugged in construction, easy to install and reliable in use.

Further objects and advantages of the present invention will become more apparent from a consideration of the following detailed description taken in conjunction with the drawings in which:

FIGURE 1 is a fragmentary side elevational view showing a weather strip assembly constructed according to the principles of the present invention;

FIG. 2 is a transverse sectional view of the structure of FIG. 1 taken along the line 2—2 thereof;

FIG. 3 is a transverse sectional view through the fastener shown in FIG. 1 and taken along the line 3—3 thereof; and FIG. 4 is an exploded view of the structure of FIG. 1 prior to the assembly thereof.

Generally stated, the highly versatile improved weather strip assembly of this invention comprises a resilient elongated body of deformable, rubber-like material in which is removably positioned an elongated, rigidifying non-metallic member provided with means for detachably receiving a plurality of non-metallic fasteners, and fasteners penetrating one surface of the body of rubber-like material and secured to the elongated rigidifying member positioned therein.

Referring more specifically to the drawings, the weather strip assembly of the present invention includes a resilient elastomeric body generally designated 10 fabricated from rubber or other rubber-like material. This body 10 has an elongated, rigidifying, non-metallic carrier member 11 removably positioned therein and the metal-free assembly of this invention is completed by the insertion of a plurality of fasteners 13 through one surface of the body 10 and into the carrier 11 to join the elements into one integral unit which is easily attachable to a door frame or other closure surface.

The body 10 may be formed in predetermined or indefinite lengths in a suitable continuous process such as by extrusion or injection molding. Additionally, this elastomeric body 10 may have a cross-section suited to the particular environment in which it is to be used. In the device illustrated, the body 10 includes a base portion 12, adapted to receive the non-metallic carrier member 11, and an integral sealing lip portion 14 formed hollow at 15 to provide the requisite degree of resilience to form a weathertight seal when the lip portion 14 is in contact with its abutting surface, such as, for example, when a door is closed. The sealing lip portion 14 is provided with longitudinally extending contact surfaces 17 and 19 along the outer portion thereof for sealing engagement with a door or door frame when the door is closed. The strip base portion 12 has an outer portion formed with a pair of longitudinally extending sealing lips 21 and 23 and a recessed face 25. A longitudinally extending opening 26 is formed in the base portion 12 for removably receiving the non-metallic carrier 11.

This carrier 11 may be constructed from any rigid, non-corrosive, non-metallic substance such as, for example, wood, hard rubber, synthetic or natural plastic materials of either the thermoplastic or thermosetting type including the phenolics, polyesters, epoxies, vinyls, polystyrenes, polyethylenes, and the like. A particularly suitable material for use as the carrier 11 is polypropylene. Carrier 11 may be fabricated in continuous strip form in any suitable manner, and when it is a plastic material by extrusion or injection molding. It is generally concave in cross-section having spaced longitudinal edge portions 47 for engaging and compressing the wall of the body member opening 26 adjacent the face 25 of body member 10. A plurality of spaced openings 45 are formed in the carrier 11 and are adapted to align with spaced openings 49 in the body base portion 12 for receiving and retaining a portion of the fasteners 13 in a manner to be described. Additionally, the stiff nature of the carrier 11 makes the elastomeric body 10 much easier to handle when assembled therein, although carrier 11 is sufficiently flexible to enable the assembly to conform to non-planar surfaces.

The fasteners 13 may be made from any suitable wear and corrosion resistant material such as those indicated above as suitable for carrier 11, and for general utility and best overall performance polypropylene is preferred. Fasteners 13 have a generally cylindrical body portion 27 separated from an enlarged head or bulb end portion 43 by an annular flange 29. The bulb end portion 43 of each fastener is adapted to be inserted through the aligned openings 49 and 45 formed in the sealing body base portion 12 and the carrier 11, respectively, and is generally hemispherical in shape, the diametral portion forming a ledge or flat surface 44 which abuts the lower surface of carrier 11 adjacent the openings 45 when assembled therein. The bulb end 43 diameter is slightly greater than the diameter of the opening 45 and when snapped into position thus provides a positive joining of the elements into a single assembly which resists inadvertent separations after assembly. The fastener 13 and the carrier 11, however, are fabricated from materials which are sufficiently resilient to permit forced insertion of the bulb end 43 through the opening 45 during assembly of the parts, and disassembly by pulling bulb end 43 from the carrier opening 45, when desired. However, the force needed to achieve disassembly far exceeds any force exerted on the fastener during normal door opening and closing. The axial length of the fastener bulb end 43 is such that when assembled within the carrier opening 45, the carrier longitudinal edges 47 are squeezed tightly against the wall of the opening 26 adjacent the face 25 to enhance the sealing effect of the base portion 12 in a manner to be described.

The fastener cylindrical body portion 27 is adapted to be received within suitable openings 37 formed in a frame member 39 intended to represent generally a conventional closure or closure frame, for example, an automobile door. The cylindrical body portion 27 is formed with a plurality of integral retaining clips 31 each having a free end portion adjacent to and spaced from the annular flange 29. As shown, the clip free ends are formed slightly outwardly and have a flat end portion 35 sufficiently spaced from the flange 29 to engage behind the frame member 39 and adjacent the opening 37 when the fastener 13 is inserted in the opening 37 and maintain snug engagement between the flange 29 and the frame 39. An outer surface 33 of the clips 31 forms a smooth taper and the clips are sufficiently resilient so that when the fastener cylindrical body 27 is inserted through the opening 37, the opening wall portion engages and gradually cams the clips 31 radially inwardly. When the fastener is fully inserted in the opening 37, the flange 29 engages the frame 39 with the clips 31 springing outwardly to the position shown in FIG. 2 to retain the fastener 13 within the frame 39.

When the weather strip components, including the rubber-like body 10, the carrier 11 and the fasteners 13 are assembled together and fastened to the frame 39 through the openings 37, the sealing lips 21 and 23 of the body 10 are pressed tightly against the frame 39 forming an air and weathertight seal therebetween. Additionally, the carrier edges 47, since they are squeezed against the wall of the base portion opening 26, further enhance the sealing effect between the base portion 12 of the body and the frame 39. If, for any reason, one longitudinal side edge of the base portion 12 tends to lift away from the frame 39, the carrier 11 is twisted about a longitudinal axis thereby increasing the sealing effect adjacent the other longitudinal side edge of the base portion.

In use, the body member base portion 12 is attached to a closure assembly, for example, an automobile door and the sealing lip portion 14 sealingly engages the closure assembly, for example, the surrounding door jamb when the door is closed. As in the case of automobiles, these doors take a variety of configurations and have a number of straight and curved portions. Thus, it is desirable that sealing assemblies of the type herein described be adapted for use with any one of these various door assemblies. To this end, the carrier member 11 is formed with serrations 51 along its longitudinal edge portions 47. These serrations increase the flexibility of carrier 11 and permit it to be bent as needed without undue stress or deformation of the edge portions 47 to conform to the contour of any supporting surface to which it is to be attached.

The spacing of the opening 45 in the carrier 11 generally conforms to the spacing between the openings 37 in the particular door frame. The spacing of the openings 49 in the body member 10, however, is slightly less than the spacing between the openings 45 and the openings 37. Thus, when the carrier 11 is inserted in the opening 26, the body member 10 must be stretched slightly to align the openings 45 and 49. This is easily accomplished by first aligning a pair of openings 45 and 49 at one end of the carrier 11 and the body 10 and inserting a fastener bulb end 43 therethrough and thereafter stretching the body 10 to align successive openings 45 and 49 and inserting the remainder of the fastener bulb ends 43. To enhance this assembly, the opening 26 is designed to snugly receive the carrier 11. Additionally, this snug fit facilitates shipping the body 10 and carrier 11 in an assembled condition with or without the fasteners 13 being inserted.

To form the assembly of this invention one need only insert the carrier 11 in the opening 26 formed in the body member 10 and align the apertures 45 and 49 as above set forth. The bulb ends 43 of a plurality of fasteners 13 are forced through these aligned openings and are retained within the openings 45. In ultimate use, the body portions 27 of the fasteners 13 are inserted into the openings 37 in a frame member 39 with the weather strip assembly, including the carrier 11, being bent longitudinally thereof to conform to the frame configuration and with the spring clips 31 snapping in behind the frame member.

When it is desired to remove the weather strip assembly from its frame member 39 for any purpose, this is readily accomplished by applying outward pulling force directly to body 10. The fasteners 13 and carrier 11 are sufficiently resilient so that upon the application of sufficient force, the bulb ends 43 can slip out of the openings 45 in the carrier 11 and through the openings 49 in the body 10. The fasteners 13, on the other hand, remain attached to the frame 39 and can only be removed therefrom by shearing the clip retainers 31. Thereafter, the weather strip assembly is reattached simply by inserting the bulb ends 43 into the aligned openings 45 and 49 as above. Thus, no wear is produced on the body 10 in assembly or disassembly, consequently providing a materially increased life span therefor.

By the present invention, there is provided a highly versatile improved closure weather strip assembly which is entirely nonmetallic and therefore highly corrosion resistant and which is adapted for easy assembly and designed for long and effective use. While a preferred embodiment of the present invention has been illustrated and described above, various additions, substitutions, modifications and omissions may be made thereto without departing from the spirit of the invention as encompassed by the appended claims.

What is claimed is:
1. A weather strip assembly comprising
   a body of compressible elastomeric material having at least one longitudinally extending opening therethrough, an elongated non-metallic carrier member removably positioned within said opening, said carrier formed with a plurality of apertures therethrough adapted to align with apertures in said body, a non-metallic fastener including an enlarged flexible head having a rounded outer end positioned in each of the aligned said apertures, said enlarged head adapted to snap through said carrier apertures and being removable therefrom under axial force applied thereto whereby to removably secure said body and said carrier together, said fastener having a body portion, which includes means for fixedly uniting said assembly to a support surface.

2. An assembly as defined in claim 1 wherein said body of elastomeric material has a concave outer portion defining longitudinally extending resilient sealing portions, said apertures in said body extending from within said concave portion whereby to force said resilient sealing portions into weathertight engagement with said supporting surface.

3. An assembly as defined in claim 1 wherein said fastener head has a generally flat ledge behind said rounded outer end adapted to seat against said carrier around said carrier apertures when said head is snapped through said carrier.

4. A weather strip assembly comprising a body of compressible elastomeric material having at least one longitudinally extending opening therethrough and a concave outer portion adjacent thereto, an elongated non-metallic carrier member removably positioned within said opening, said carrier formed with a plurality of apertures therethrough adapted to align with apertures in said body within said concave portion, a fastener including a flexible bulb end portion having a rounded outer surface and a maximum lateral dimension slightly greater than the lateral dimension of said carrier apertures adapted to be forceably positioned in the aligned said apertures for removably securing said body and said carrier together, said fastener having a body portion having a plurality of integral resilient clip retainers capable of fixedly uniting said assembly to a support surface.

5. An assembly as defined in claim 4 wherein said carrier is of concave cross section and is provided with longitudinally extending serrated edge portions.

6. An assembly as defined in claim 4 wherein said fastener has an outwardly extending flange between said bulb end and said body portion, said flange engaging said elastomeric body at said concave outer portion when said bulb end is positioned in the aligned apertures in said body and carrier.

References Cited by the Examiner

UNITED STATES PATENTS

| 1,760,267 | 5/1930 | Carr. |
| 1,964,002 | 6/1934 | Lester _____ 85—5 X |
| 2,130,017 | 9/1938 | Lewis _____ 20—69 |
| 2,424,757 | 7/1947 | Klumpp _____ 85—80 X |
| 3,029,486 | 4/1962 | Raymond. |
| 3,115,225 | 12/1963 | Fraylick et al. _____ 85—5 X |
| 3,213,494 | 10/1965 | Mayers et al. _____ 20—69 |

REINALDO P. MACHADO, *Primary Examiner.*

HARRISON R. MOSELEY, *Examiner.*

W. E. HEATON, P. C. KANNAN,
*Assistant Examiners.*